United States Patent
Mok et al.

(10) Patent No.: US 7,633,778 B2
(45) Date of Patent: *Dec. 15, 2009

(54) SWITCHED-CAPACITOR REGULATORS (75) Inventors: Kwok Tai Philip Mok, Hong Kong (CN); Hoi Lee, Hong Kong (CN)

(73) Assignee: The Hong Kong University of Science an Technology, Hong Kong (CN)

( * ) Notice: Subject to any disclaimer, the term of this patent is extended or adjusted under 35 U.S.C. 154(b) by 34 days.

This patent is subject to a terminal disclaimer.

(21) Appl. No.: 12/059,975

(22) Filed: Mar. 31, 2008

(65) Prior Publication Data
US 2008/0212347 A1    Sep. 4, 2008

Related U.S. Application Data

(63) Continuation of application No. 11/338,623, filed on Jan. 24, 2006, now Pat. No. 7,375,992.

(60) Provisional application No. 60/645,966, filed on Jan. 24, 2005.

(51) Int. Cl.
*H02M 3/18* (2006.01)
(52) U.S. Cl. .......................... 363/60; 323/266
(58) Field of Classification Search .................. 363/60; 327/535, 536; 323/266; 307/109, 110
See application file for complete search history.

(56) References Cited

U.S. PATENT DOCUMENTS

| | | | |
|---|---|---|---|
| 4,733,159 A | | 3/1988 | Edwards et al. |
| 5,323,123 A | * | 6/1994 | Philippe ............... 330/277 |
| 5,680,300 A | | 10/1997 | Szepesi et al. |
| 6,169,444 B1 | | 1/2001 | Thurber, Jr. |
| 6,188,590 B1 | | 2/2001 | Chang et al. |
| 6,300,820 B1 | | 10/2001 | Fotouhi et al. |
| 6,392,904 B1 | | 5/2002 | Bayer et al. |
| 6,411,531 B1 | | 6/2002 | Nork et al. |

(Continued)

OTHER PUBLICATIONS

Chen et al., "Switched-capacitor power converters with integrated low drop-out regulators," IEEE International Symposium on Circuits and Systems, Sydney, Australia, vol. III pp. 293-296, 2001.

(Continued)

*Primary Examiner*—Jessica Han
(74) *Attorney, Agent, or Firm*—Schwabe, Williamson & Wyatt, P.C.

(57) ABSTRACT

A switched-capacitor regulator is provided for regulating the output voltage of a voltage supply. The switched-capacitor regulator includes a supply input terminal capable of receiving a supply voltage, two or more flying capacitors, a regulation switch located between each flying capacitor and the supply input terminal, and a voltage control circuit. The activity of the regulation switches is controlled by the voltage control circuit. In one embodiment of the invention, the voltage control circuit includes a feedback resistance area having one or more feedback resistors located between the output of the flying capacitors and a ground terminal, a first gain stage connected to the feedback resistance area, and two or more second switchable gain stages, which are each connected to a regulation switch and the first gain stage. The switched-capacitor regulator operates in pseudo-continuous regulator mode using three-stage switchable operational amplifiers with time-multiplexed pole-splitting compensation.

23 Claims, 13 Drawing Sheets

U.S. PATENT DOCUMENTS

| | | |
|---|---|---|
| 6,445,623 B1 | 9/2002 | Zhang et al. |
| 6,556,067 B2 | 4/2003 | Henry |
| 6,618,296 B2 | 9/2003 | Zhang |
| 6,642,774 B1 | 11/2003 | Li |
| 6,661,683 B2 | 12/2003 | Botker et al. |
| 6,717,458 B1 | 4/2004 | Potanin |
| 6,856,525 B2 | 2/2005 | Wallis |
| 6,937,487 B1 | 8/2005 | Bron |
| 7,375,992 B2 * | 5/2008 | Mok et al. ............ 363/60 |

OTHER PUBLICATIONS

Lee et al., "Switching Noise Reduction Techniques for Switched-Capacitor Voltage Doubler," Proceedings of the IEEE 2003 Custom Integrated Circuits Conference, pp. 693-696, 2003.

Office Action, mailed May 24, 2007, for U.S. Appl. No. 11/338,623.

* cited by examiner

SWITCHED-CAPACITOR REGULATORS

CROSS-REFERENCE TO RELATED APPLICATIONS

This application is a continuation of U.S. application Ser. No. 11/338,623 filed Jan. 24, 2006 which claims priority from U.S. Provisional Application No. 60/645,966, filed Jan. 24, 2005, entitled AN AREA-EFFICIENT AND HIGH-ACCURACY SWITCHED-CAPACITOR REGULATOR. Both application Ser. No. 11/338,623 and 60/645,966 are hereby incorporated by reference in their entirety.

FIELD OF THE INVENTION

The invention relates to switched-capacitor regulators, and in particular to switched-capacitor regulators with pseudo-continuous output regulation using a three-stage switchable operational amplifier and time-multiplexed pole-splitting compensation techniques. The invention is useful for decreasing chip area and improving the accuracy of output voltage.

BACKGROUND OF THE INVENTION

Switched-capacitor regulators are needed in many portable electronic devices to provide supply voltages for different systems. Possible devices include personal digital assistants, notebook computers and mobile phones.

The importance of switched-capacitor regulators is demonstrated by their capability to provide dc-to-dc conversions without the use of inductors. Less conducted electromagnetic interference and cross couplings are then generated to other systems, since no magnetic components are used. Existing control methods adopted in switched-capacitor regulators require extra power transistors or auxiliary circuits to regulate the output voltage. These increase the chip area of the thereby increasing the manufacturing cost.

The accuracy of the output voltage is critical to switched-capacitor regulators. The accuracy is determined by line and load regulations and the load-transient recovery time of regulators, which in turn is dependent on the implementation of the controller. Existing implementations employ single-stage linear amplifier in the controller, which can affect the accuracy of the regulators.

Figure 1:
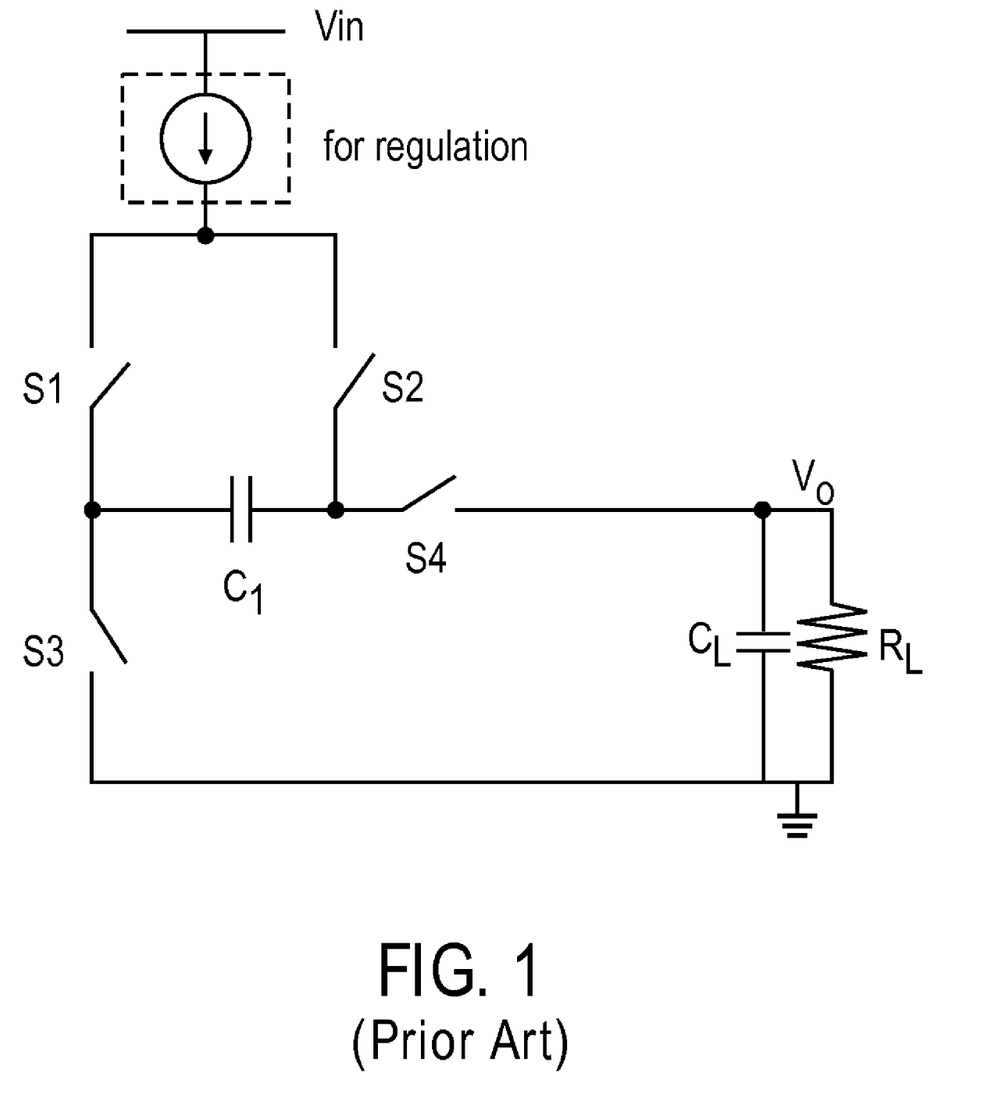
FIG. 1 is a schematic diagram of a known single-ended charge pump circuit.
Figure 2:
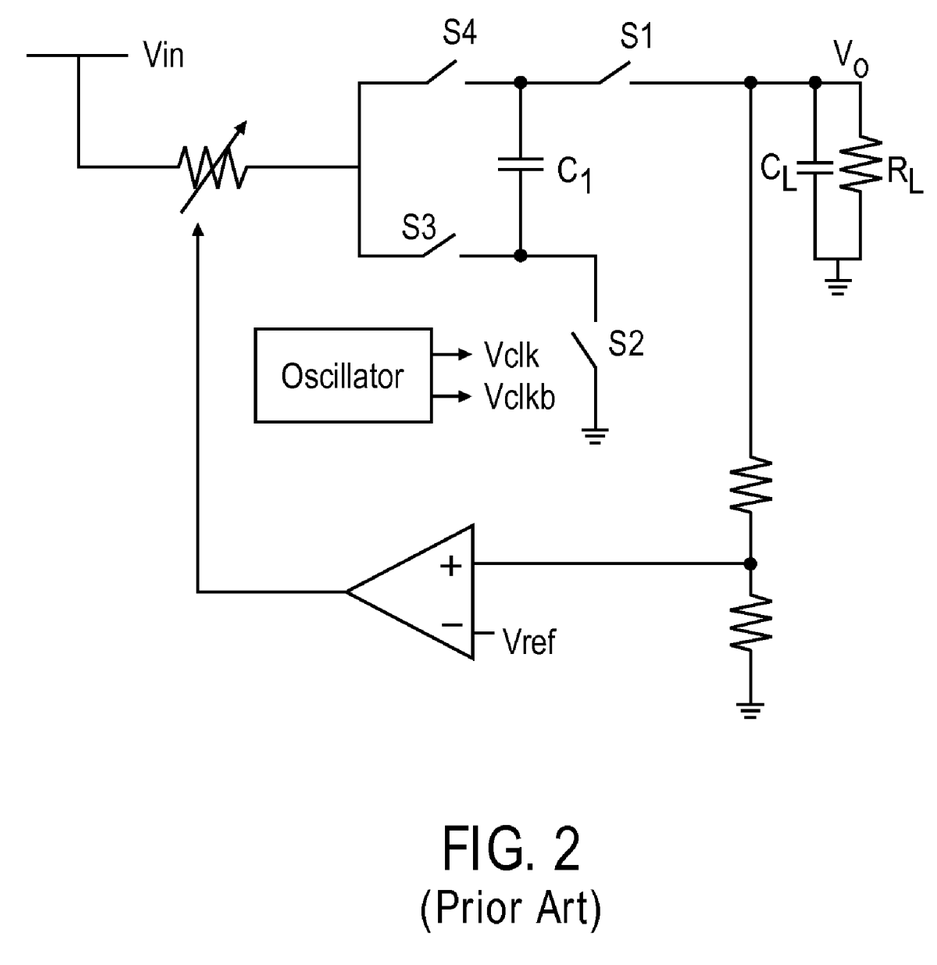
FIG. 2 is a schematic diagram of a known charge pump dc/dc converter.

A number of methods have been employed to maintain the output voltage of a switched-capacitor regulator. Both U.S. Pat. No. 6,445,623 and U.S. Pat. No. 6,411,531 disclose two single-ended switched-capacitor regulators and are illustrated in FIGS. 1 and 2 respectively. Additional circuitry (either a current source or a variable resistor connected between the input supply voltage and switches S1, S2, S3 and S4) is required to maintain the output voltage. However, the additional circuitry is implemented by power transistors; thereby increasing the chip area and manufacturing cost.

Figure 3:
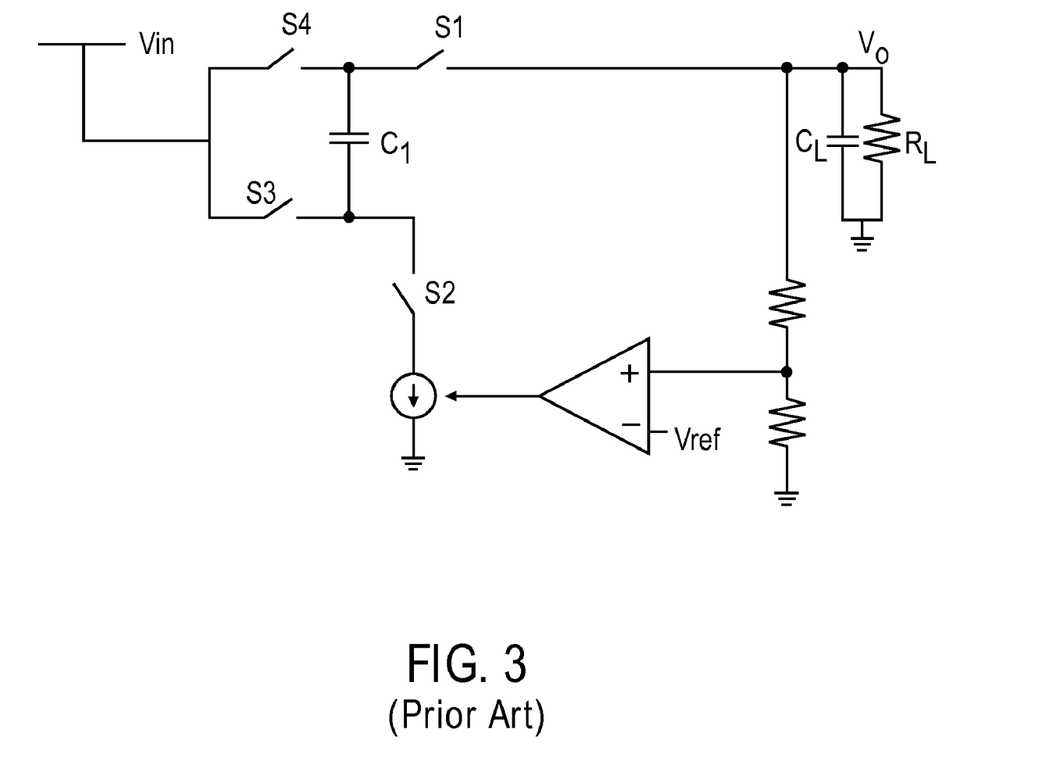
FIG. 3 is a schematic diagram of a known charge pump regulator.
Figure 4:
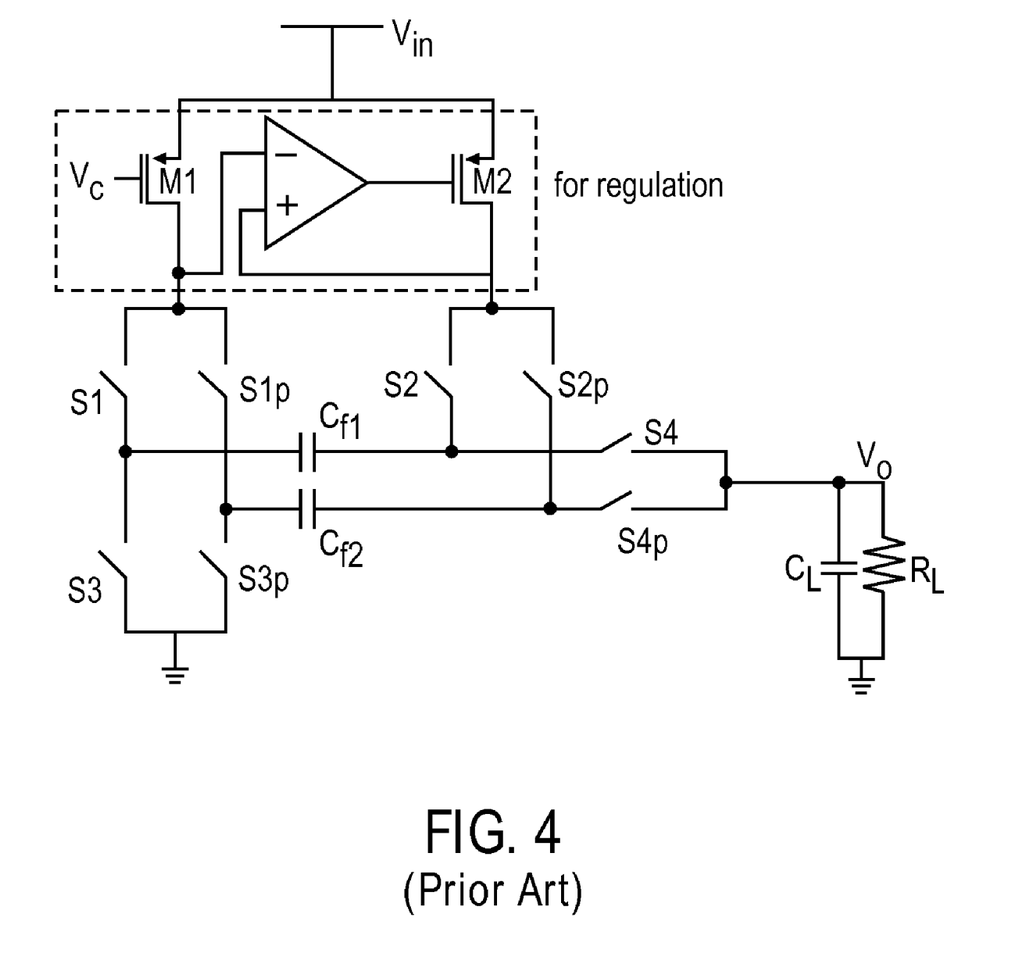
FIG. 4 is a schematic diagram of a known cross-coupled charge pump.

Similarly, U.S. Pat. No. 6,411,531 also describes a single-ended switched-capacitor regulator as shown in FIG. 3, which uses an extra current source connected between the power switches and ground for output-voltage regulation. Therefore, the area efficiency of the switched-capacitor regulator is not ideal FIG. 4 shows a cross-coupled switched-capacitor regulator from U.S. Pat. No. 6,618,296. The cross-coupled design is similar to the configuration in U.S. Pat. No. 6,445,623, used to achieve dual phase operation. Extra power transistors are still required for regulating the output voltage, and this lowers the area efficiency of the regulator.

Figure 5:
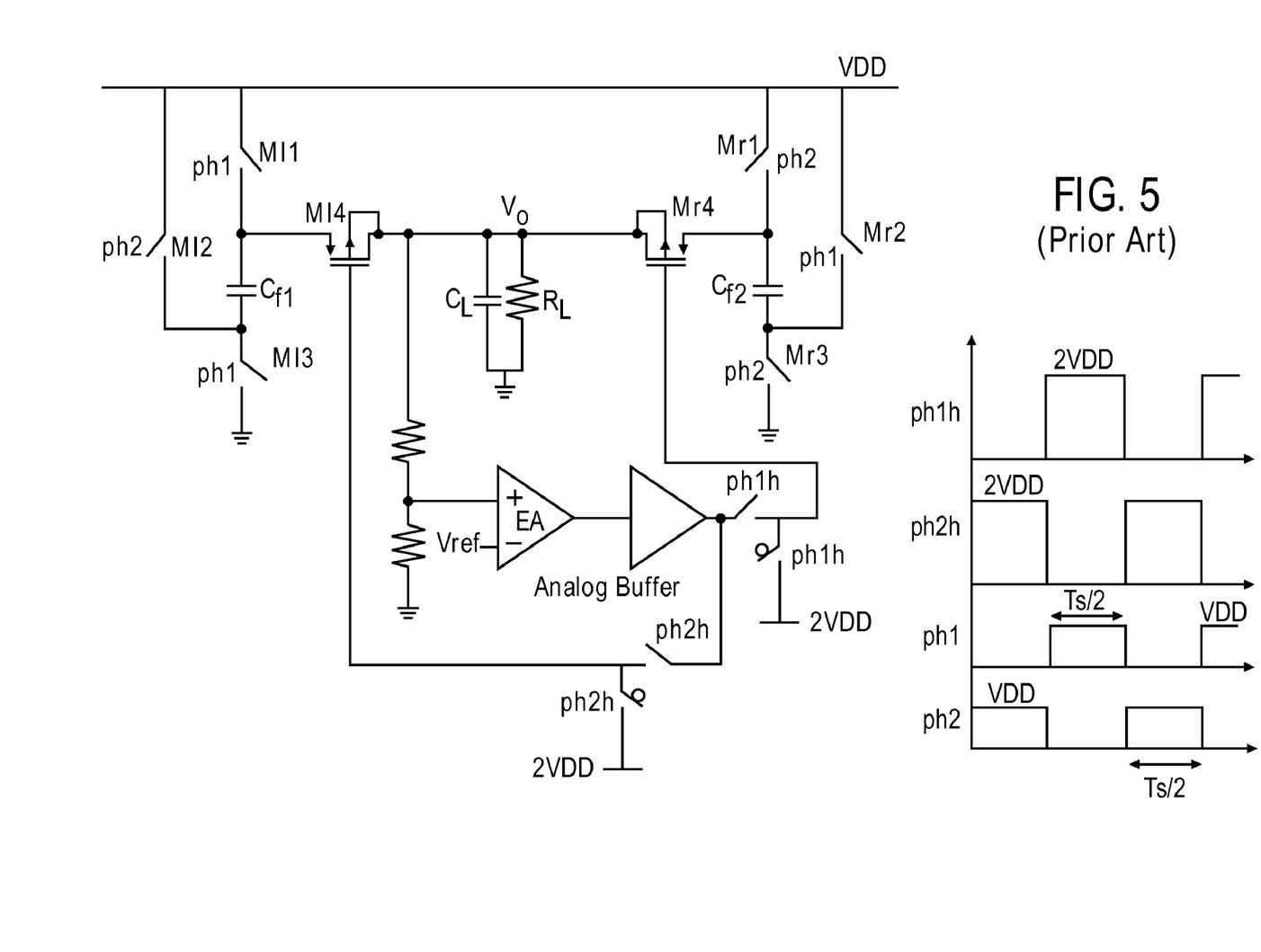
FIG. 5 is a schematic diagram of a known voltage doubler with switching low-dropout regulator.

FIG. 5 shows a cross-coupled switched-capacitor regulator which maintains the output voltage without using extra power transistor, as described in W. Chen, W. H. Ki, P. K. T. Mok and M. Chan, "*Switched-capacitor power converters with integrated low-dropout regulators*", IEEE International Symposium on Circuits and Systems, Sydney, Australia, Vol. III, pp. 293-296; 2001. Power transistors M14 and Mr4 are alternately turned off during the capacitor charging phase and regulate the output voltage of the control loop during the capacitor discharging phase. Therefore, M14 and Mr4 function as switching low-dropout regulators (SLDR) and the control scheme is known as an SLDR mechanism. By adopting SLDR control, an analog buffer should be used in order to enable M14 and Mr4 to operate in the saturation region during capacitor discharge phase. However, extra auxiliary voltage doubler are required to generate a high-voltage clock signal swinging up to $2V_{DD}$ so as to drive extra switches connected to the output of the analog buffer. Extra auxiliary voltage doublers increase both the area and total static current dissipation in the controller. In addition, since the gate-voltage swing of M14 and Mr4 is $2V_{DD}$ and increases with the input supply voltage, the SLDR control causes switching noise problems in the switched capacitor regulator. Moreover, gain stage and analog buffer in the controller cascaded with power transistors M14 and Mr4 results in a two-stage switchable opamp. Two-stage switchable opamps may not provide sufficient loop gain magnitude, and hence the accuracy of the switched capacitor regulator is not optimized.

There is a need for a control method for a switched-capacitor regulator that is able to efficiently and accurately regulate the supply voltage of electronic devices without requiring additional power transistors or auxiliary circuits.

SUMMARY OF THE INVENTION

In a first aspect of the invention, there is provided a switched capacitor regulator for regulating output voltage. This switched capacitor regulator may have a supply input terminal capable of receiving a supply voltage. There may be two or more flying capacitors with regulation switches between each flying capacitor and the input terminal. A voltage control circuit may be configured to control the activity of the regulation switches.

A preferred voltage control circuit comprises a feedback resistance area comprises one or more feedback resistors located between the output of the flying capacitors and a ground terminal, a first gain stage connected to the feedback resistance area, and two or more second switchable gain stages, each connected to a regulation switch and the first gain stage.

Further preferred embodiments will be apparent throughout the specification.

The switched-capacitor regulator according to the present invention decreases chip area and results in a comparatively low output ripple at low switching frequencies; which can improve the accuracy of the resulting output voltage.

Usually an additional power transistor is required to regulate the output voltage. By means of the present invention, a switched-capacitor regulator operates in pseudo-continuous regulator mode using three-stage switchable opamps with time-multiplexed pole-splitting compensation technique. The regulator controls the output voltage continuously during every capacitor-discharging phase without adding extra power transistor nor requiring high-voltage clock signals; thereby enhancing area efficiency. In addition, the use of three-stage switchable opamps increases loop-gain magnitude and improves line and load regulations by alternate switching of gain stage in different clock phases. The time-multiplexed pole-splitting compensation technique in the switchable opamp not only ensures stability but also reduces load-transient recovery time.

The switched-capacitor regulator according to the invention is of particular advantage if applied in an electronic appliance, such as, but not limited to, a portable electronic device.

The invention may also broadly be said to consist in any alternative combination of features as described or shown in the accompanying drawings. Known equivalents of these features not expressly set out are nevertheless deemed to be included.

BRIEF DESCRIPTION OF THE DRAWINGS

The above-mentioned objects and some embodiments of the present invention can be more clearly understood from the following detailed description considered in conjunction with the following drawings, in which.

DETAILED DESCRIPTION OF THE INVENTION

Figure 6:
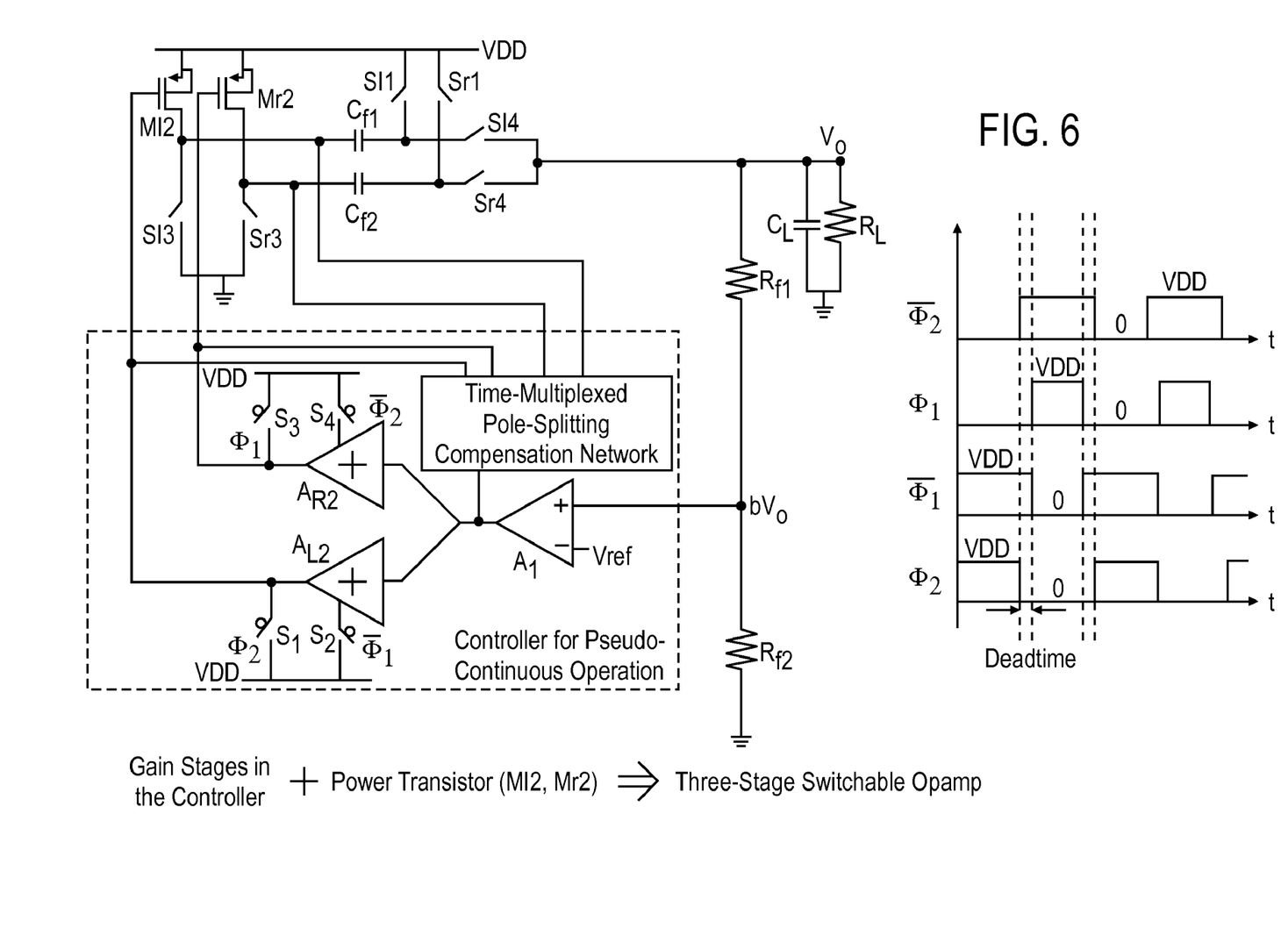
FIG. 6 is a schematic diagram of a boost switched-capacitor regulator according to an embodiment of the present invention.
Figure 7:
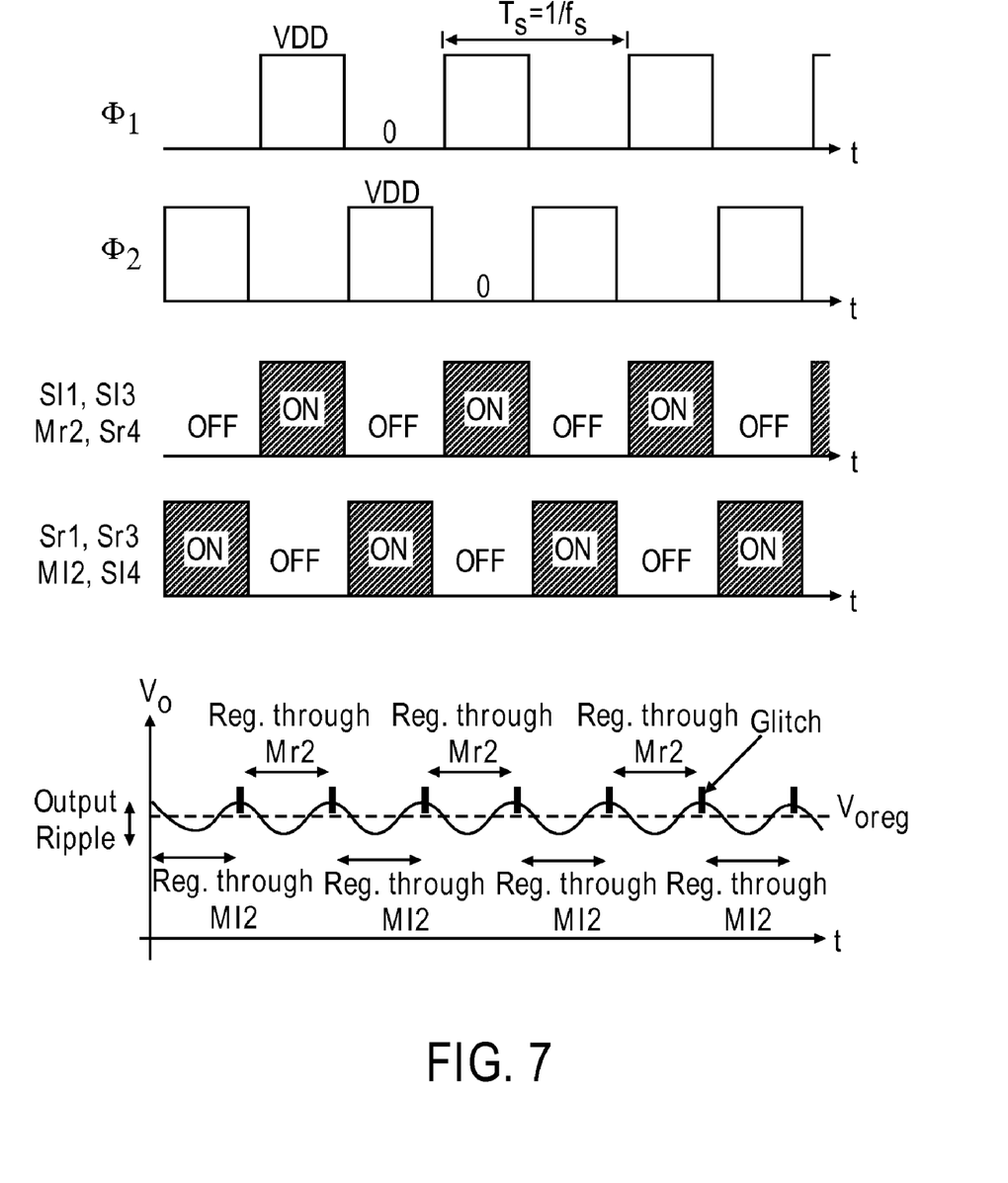
FIG. 7 is a timing diagram of a boost switched-capacitor regulator of the embodiment of FIG. 6.

The present invention is based on the concept of pseudo-continuous control switched-capacitor regulator. FIG. 6 shows an embodiment of the structure of the regulated cross-coupled voltage doubler with pseudo-continuous control. In the cross-coupled power stage, there are eight power transistors M11-M14 and Mr1-Mr4, and two flying capacitors $C_{f1}$ and $C_{f2}$ for voltage conversion. The additional circuitries Mal, Mar, Ral and Rar are used to reduce both the shoot-through current and switching noise of the converter, while the increase in area due to the additional circuitries is insignificant, as disclosed in H. Lee and P. K. T. Mok, "*Switching Noise Reduction Techniques for Switched-Capacitor Voltage Doubler,*" *Proceedings of the IEEE* 2003 *Custom Integrated Circuits Conference*, pp. 693-696, 2003. With pseudo-continuous control, both M12 and Mr2 operate as regulation transistors (also referred to as regulation switches), while other power transistors function as switches, therefore no additional power transistors are needed to continuously regulate the output. The converter according to the present invention is thus more area efficient than previous models. In preferred embodiments, the regulation switches are bipolar transistors or MOSFET transistors. The regulation switches may also function as variable resistors or gain stages. The principle of operation can best be described with reference to the timing diagram in FIG. 7. The control mechanism operates in non-overlapping clock phases $\Phi_1$ and $\Phi_2$ alternately. When $\Phi_2=V_{DD}$, both power transistors Mr2, Mr4 are off and Mr1, Mr3 are on, so the voltage across $C_{f2}$ is increased to $\sim V_{DD}$ in the charging phase. At the same time, M12 and M14 are on and $C_{f1}$ is in the discharging phase. Since both switches $S_{L1}$ and $S_{L2}$ are off, an appropriate dropout voltage ($V_{DO}$) is regulated across M12 by gain stages $A_1$ and $A_{L2}$ in the controller. The dropout voltage stacks on $V_{DD}$ that is stored in $C_{f1}$ in the previous half-clock period to provide the desired regulated output voltage $V_{oreg}$, where $V_{oreg} \approx V_{DO}+V_{DD}=(1+R_{f1}/R_{f2})V_{ref}$. In the next half-clock cycle of $\Phi_1=V_{DD}$, the operating phases of $C_{f1}$ and $C_{f2}$ are swapped, so $V_{oreg}$ is maintained by regulating Mr2 using gain stages $A_1$ and $A_{R2}$. The above actions repeat in every clock period, so continuous-output regulation is achieved as illustrated by the waveform of $V_O$. Since both power transistors M12 and Mr2 are regulated alternately corresponding to the discharging phase of $C_{f1}$ and $C_{f2}$, respectively, the proposed mechanism operates at pseudo-continuous mode. This pseudo-continuous control can also be used in other types of switched-capacitor dc-dc converters with different cross-coupled power stages.

Figure 8:
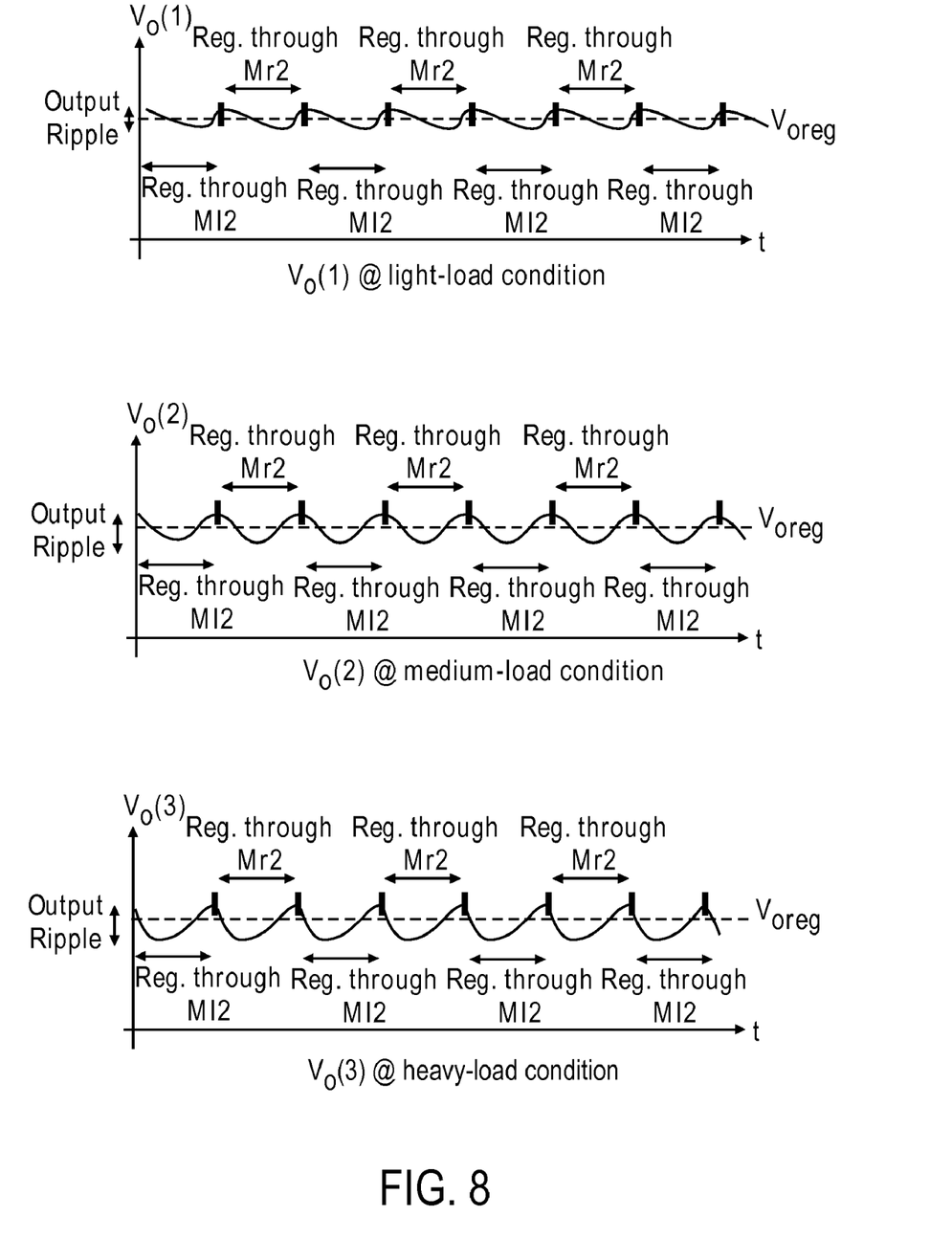
FIG. 8 is output ripple waveforms of a boost switched-capacitor regulator of the embodiment of FIG. 6.

$V_O(1)$ and $V_O(2)$ in FIG. 8 illustrate the output ripple in different load currents. Initially, the ripple increases with the load current. Due to continuous-output regulation, when the ripple amplitude reaches the limit defined by the load regulation, it stays constant with respect to the load-current change. Both upper and lower limits of the output are maintained at particular levels by varying $V_{DO}$. Low ripple can thus be attained, provided that the converter has a large low-frequency loop-gain magnitude. Moreover, the load-transient response of the a pseudo-continuous control converter is independent of a wide range of switching frequencies. The converter can achieve a fast load-transient response by widening the loop-gain bandwidth and high light-load power efficiency by using low switching frequency simultaneously.

To implement the pseudo-continuous control, gain stages in the controller cascaded with power transistors M12 and Mr2 result in a three-stage switchable opamp. The three-stage switchable opamp can increase the low-frequency loop-gain magnitude and improve the load regulation in low-voltage condition. Both switchable second gain stages regulate the output or turn off alternately in every half-clock period to save the static current dissipation in the controller.

Figure 9:
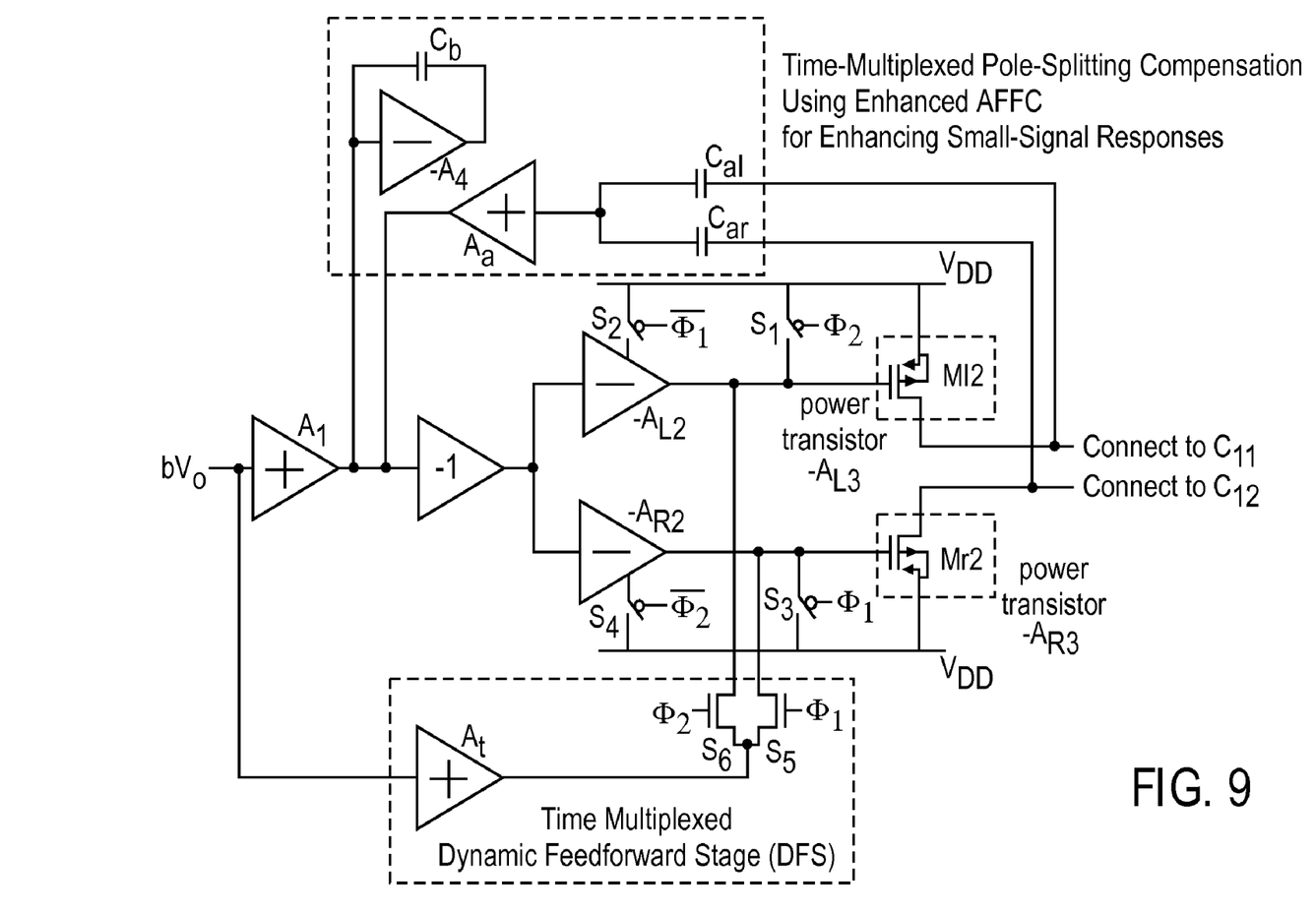
FIG. 9 is the schematic diagram of an exemplary embodiment of the present invention showing a three-stage switchable opamp with time-multiplexed pole-splitting compensation network for a boost switched-capacitor regulator of the embodiment of FIG. 6.

The stability and loop-gain bandwidth in low-power condition are determined by the frequency compensation of the three-stage switchable opamp. One implementation of the pseudo-continuous control switched-capacitor regulator of the embodiment of FIG. 6 is shown in FIG. 9. Time-multiplexed enhanced active-feedback frequency compensation is employed in the pseudo-continuous control converter. The enhanced active-feedback frequency compensation consists of a damping-factor-control block and time-multiplexed active-capacitive feedback networks. Two compensation capacitors $C_{a1}$ and $C_{ar}$, with the positive gain stage $A_a$, establish an active-capacitive feedback network in every alternate half-clock period. The damping-factor-control block is located at the output of the first gain stage in order to eliminate the use of Miller capacitor. The enhanced active-feedback frequency compensation can increase the loop-gain bandwidth in low-power condition; thereby improving the load-transient response of the converter in low switching frequencies. The time-multiplexed dynamic feedforward stage generates extra dynamic current to the output of either second gain stages $A_{L2}$ or $A_{R2}$, according to clock signals $\Phi_1$ and $\Phi_2$ in order to realize a push-pull effect at the gates of power transistors M12 and Mr2. The push-pull effect relaxes the slew-rate limitation of driving M12 and Mr2 in low-power condition. As both M12 and Mr2 can be turned on and off much faster during switching, the load-transient response is further improved.

In preferred embodiments, the DC voltage gains of the first gain stage and the second switchable gain stages are greater than 1.

Figure 10A:
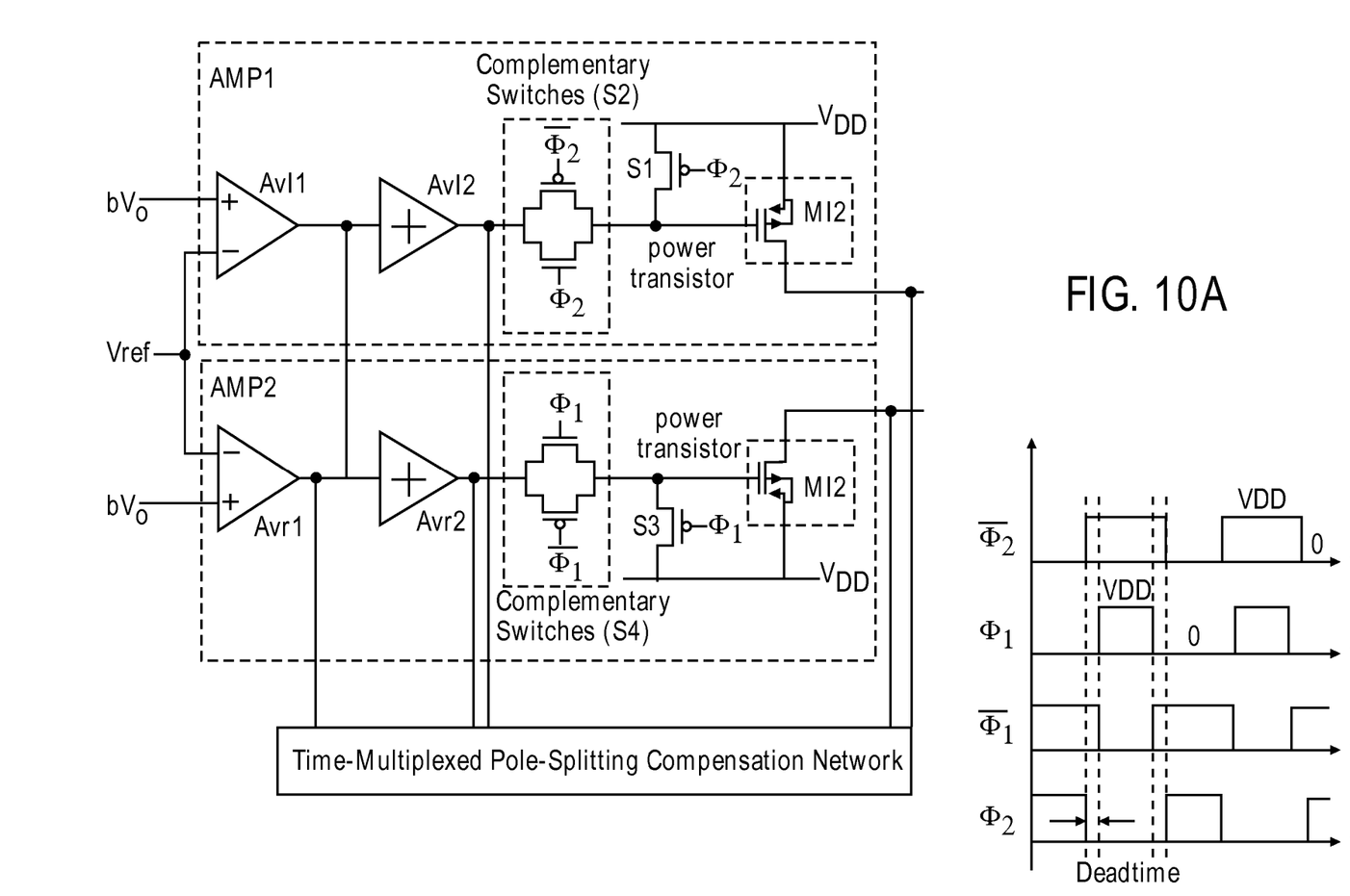
FIGS. 10(a) & (b) are the schematic diagrams of two exemplary embodiments of the present invention showing different three-stage switchable opamps with time-multiplexed pole-splitting compensation network for a boost switched-capacitor regulator of the embodiment of FIG. 6.
Figure 10B:
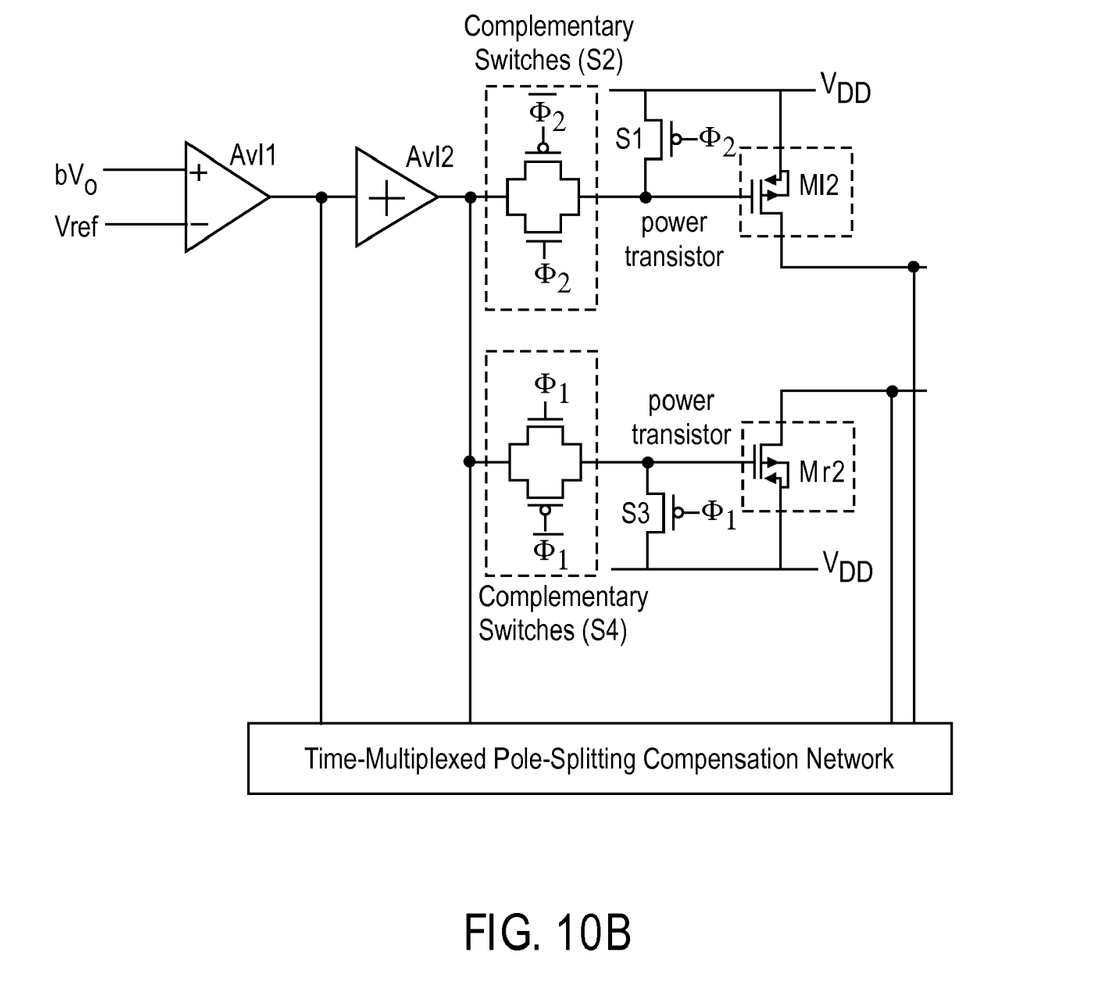

FIGS. 10(a) and 10(b) illustrate two alternative methods of implementing three-stage switchable opamps with time-multiplexed pole-splitting compensation network using serial complementary switches after second gain stages $A_{L2}$ and $A_{R2}$.

Figure 11:
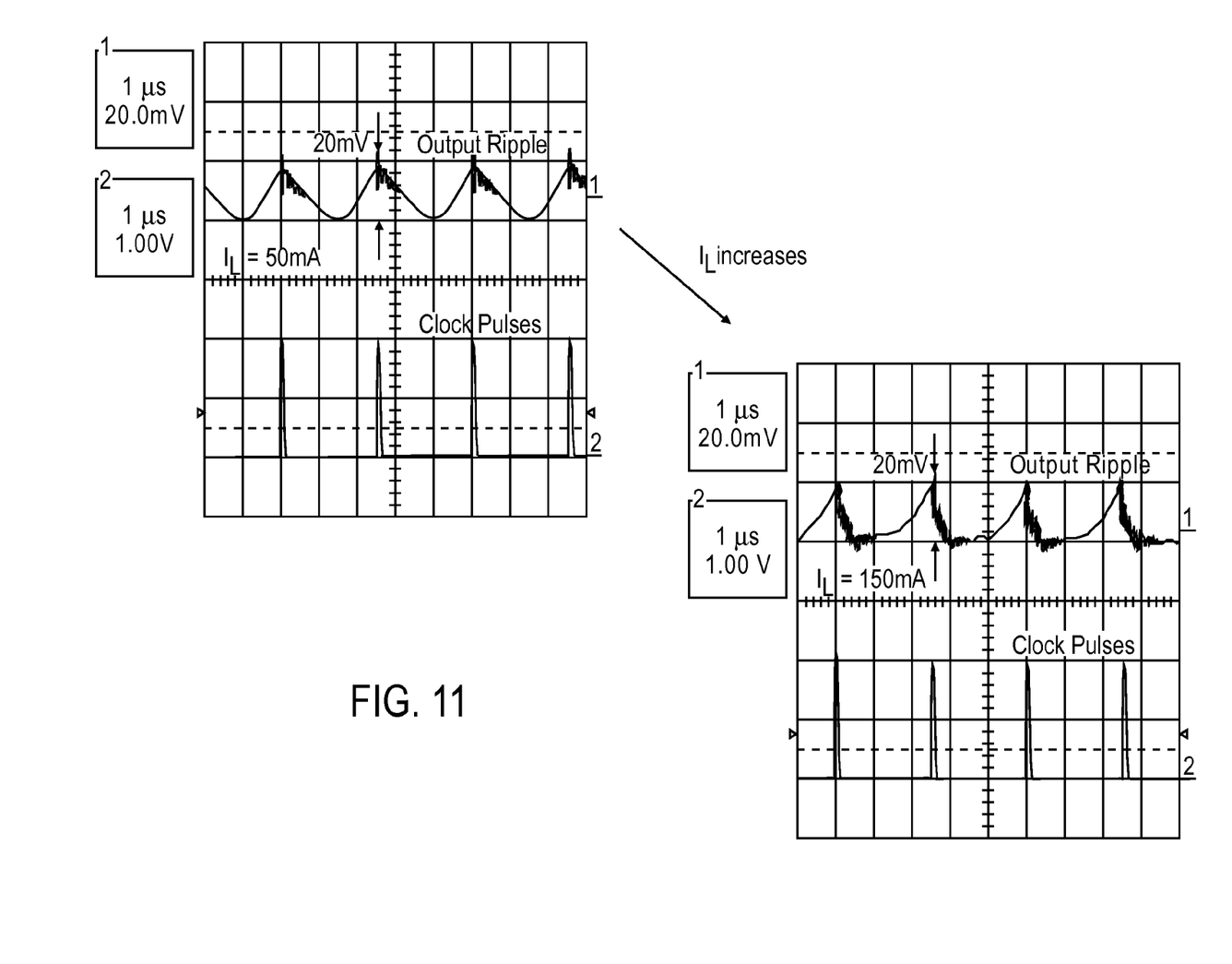
FIG. 11 is the measured output ripples of the embodiment of FIG. 6 in different load currents.
Figure 12:
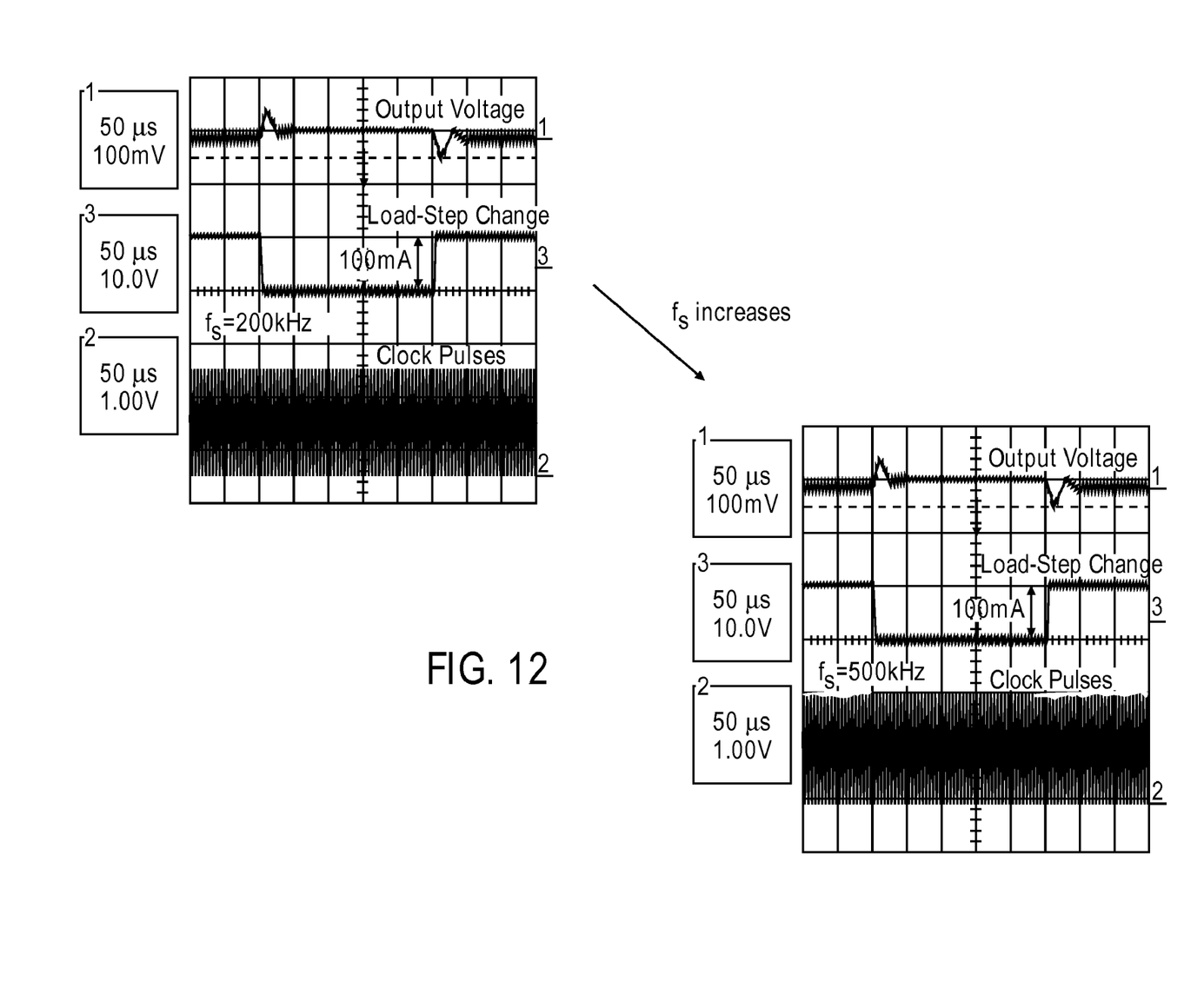
FIG. 12 is the measured transient output voltages of the embodiment of FIG. 6 in different switching frequencies.

The embodiment of FIG. 6 has been implemented by way of an example in a 0.6 μm CMOS n-well process. The maximum output voltage is regulated at $(2V_{in}-0.3)V$. FIG. 11 demonstrates that the output ripple is maintained at 20 mV when the load current increases from 50 mA to 150 mA. This justifies the continuous-output regulation provided by the proposed pseudo-continuous control. FIG. 12 shows that the same output load-transient recovery time of ~25 μs is achieved with a load change of 100 mA in 1 is for the switching frequency varying from 200 kHz to 500 kHz. Fast load-transient response is thus realized across a wide range of switching frequencies by using the described three-stage switchable opamp.

The above describes some preferred embodiments of the present invention and indicates several possible modifications but it will be appreciated by those skilled in the art that other modifications can be made without departing from the scope of the invention.

The invention claimed is:

1. A method for regulating an output voltage, the method comprising:
   outputting, by a switched capacitor regulator, the output voltage in response to receipt of a supply voltage; and
   regulating a first dropout voltage and a second dropout voltage within the switched capacitor regulator based, at least in part, on the output voltage, wherein the first dropout voltage is across a first regulation transistor located between a supply input terminal configured to receive the supply voltage and a first flying capacitor of the switched capacitor regulator, wherein the second dropout voltage is across a second regulation transistor located between the supply input terminal and a second flying capacitor of the switched capacitor regulator, and wherein the output voltage is outputted on an output voltage terminal of the switched capacitor regulator coupled to both the first flying capacitor and the second flying capacitor.

2. The method of claim 1, further comprising causing the first flying capacitor to discharge in a first time frame and the second flying capacitor to discharge in a second time frame subsequent to the first time frame to produce the output voltage in the first time frame and the second time frame, respectively.

3. The method of claim 2, wherein said regulating comprises regulating the first dropout voltage across the first regulation transistor in the first time frame and regulating the second dropout voltage across the second regulation transistor in the second time frame to regulate the output voltage in the first time frame and the second time frame, respectively.

4. The method of claim 3, further comprising:
   causing the first flying capacitor to charge in the second time frame and the second flying capacitor to charge in the first time frame; and
   periodically repeating the first time frame and the second time frame to periodically produce the regulated output voltage on the output voltage terminal in the first time frame and the second time frame, respectively.

5. The method of claim 1, further comprising regulating a third dropout voltage across a third regulation transistor located between the supply input terminal and a third flying capacitor.

6. The method of claim 1, further comprising providing a feedback voltage to affect said regulating a first dropout voltage and a second dropout voltage.

7. The method of claim 1, wherein said regulating a first dropout voltage and a second dropout voltage comprises varying variable resistances of the first and second regulation transistors.

8. A switched capacitor regulator, comprising:
   a supply input terminal configured to receive a supply voltage;
   an output node;
   a plurality of flying capacitors coupled to the output node;
   a plurality of regulation transistors, each coupled in series between corresponding ones of the plurality of flying capacitors and the supply input terminal; and
   a voltage control circuit coupled to the plurality of regulation transistors and configured to regulate dropout voltages across the plurality of regulation transistors based on outputs of the plurality of flying capacitors.

9. The switched capacitor regulator of claim 8, wherein the plurality of flying capacitors includes at least a first flying capacitor and a second flying capacitor, and further comprising a switching circuit coupled to the input terminal and to the plurality of flying capacitors and configured to charge the first flying capacitor and the second flying capacitor in an alternating fashion.

10. The switched capacitor regulator of claim 9, wherein the switching circuit is further configured to cause the first flying capacitor and the second flying capacitor to charge and discharge alternately every half-clock period.

11. The switched capacitor regulator of claim 8, wherein the regulation transistors are either bipolar transistors or MOSFET transistors.

12. The switched capacitor regulator of claim 8, wherein the voltage control circuit comprises:
   a feedback resistance area including one or more feedback resistors located between the output terminal and a ground terminal;
   a first gain stage coupled to the feedback resistance area; and
   a plurality of second switchable gain stages, each coupled to corresponding ones of the plurality of regulation transistors and the first gain stage.

13. The switched capacitor regulator of claim 12, further comprising at least one switch located between each second switchable gain stage and the supply input terminal.

14. The switched capacitor regulator of claim 12, further comprising a plurality of switches located between each second switchable gain stage and the supply input terminal.

15. The switched capacitor regulator of claim 12, further comprising a time-multiplexed dynamic feedforward stage located between the feedback resistance area and outputs of the plurality of second switchable gain stages and configured to regulate a load-transient response of the voltage control circuit.

16. The switched capacitor regulator of claim 8, further comprising a pole-splitting network coupled to the plurality of flying capacitors and the voltage control circuit and configured to regulate a load-transient response of the voltage control circuit.

17. The switched capacitor regulator of claim 8, wherein the voltage control circuit is further configured to regulate the dropout voltages, at least in part, by varying variable resistances of the plurality of regulation transistors.

18. A system, comprising:
   a DC power source;
   a supply input terminal configured to receive an input voltage from the DC power source;
   two or more flying capacitors;
   two or more regulation transistors, each located between and coupled to corresponding ones of the two or more flying capacitors and the supply input terminal;
   an output terminal coupled to output terminals of the two or more flying capacitors and configured to receive an output voltage; and
   a voltage control circuit coupled in series between the output terminal and the two or more regulation transistors and configured to regulate dropout voltages across the regulation transistors using the output voltage.

19. The system of claim 18, further comprising a switching circuit configured to cause the two or more flying capacitors to be charged and discharged alternatingly to produce the output voltage.

20. The system of claim 18, further comprising a feedback resistance area located between the output of the two or more flying capacitors and a ground terminal, wherein the voltage control circuit comprises a first gain stage coupled to the feedback resistance area and two or more second switchable gain stages, each coupled to corresponding ones of the two or more regulation transistors and the first gain stage.

21. The system of claim 20, further comprising a time-multiplexed dynamic feedforward stage located between the feedback resistance area and outputs of the two or more second switchable gain stages and configured to regulate a load-transient response of the voltage control circuit.

22. The system of claim 18, further comprising a pole-splitting network coupled to the two or more flying capacitors and the voltage control circuit and configured to regulate a load-transient response of the voltage control circuit.

23. The system of claim 18, wherein the voltage control circuit is further configured to regulate the dropout voltages of the regulation transistors, at least in part, by varying variable resistances of the plurality of regulation transistors.

* * * * *